(12) United States Patent
Grant, Jr. et al.

(10) Patent No.: US 9,879,968 B2
(45) Date of Patent: *Jan. 30, 2018

(54) COMPONENT MEASUREMENT SYSTEM HAVING WAVELENGTH FILTERING

(71) Applicant: Caterpillar Inc., Peoria, IL (US)

(72) Inventors: Marion Billingsley Grant, Jr., Princeville, IL (US); Richard Griffith Marsh, Edwards, IL (US)

(73) Assignee: Caterpillar Inc., Peoria, IL (US)

(*) Notice: Subject to any disclaimer, the term of this patent is extended or adjusted under 35 U.S.C. 154(b) by 164 days.

This patent is subject to a terminal disclaimer.

(21) Appl. No.: 14/708,728

(22) Filed: May 11, 2015

(65) Prior Publication Data

US 2016/0116269 A1    Apr. 28, 2016

Related U.S. Application Data

(63) Continuation-in-part of application No. 14/521,867, filed on Oct. 23, 2014, now Pat. No. 9,658,047.

(51) Int. Cl.
*G01B 5/008* (2006.01)
*G01B 5/20* (2006.01)

(52) U.S. Cl.
CPC ............. *G01B 5/008* (2013.01); *G01B 5/202* (2013.01)

(58) Field of Classification Search
CPC ...... G01B 5/008; G01B 11/14; G01B 11/005; G01S 17/42; G01S 17/66
See application file for complete search history.

(56) References Cited

U.S. PATENT DOCUMENTS

| 3,795,132 A | 3/1974 | Huling et al. |
| 4,901,256 A * | 2/1990 | McMurtry ............... G01B 7/28 33/503 |

(Continued)

FOREIGN PATENT DOCUMENTS

DE    20204832 U1    7/2002

OTHER PUBLICATIONS

"OmniSurf A Comprehensive Surface Profile Analysis Package", Digital Metrology, http://digitalmetrology.com/solution/omnisurf, © 2014 Digital Metrology.

(Continued)

*Primary Examiner* — Son Le
*Assistant Examiner* — Akm Zakaria
(74) *Attorney, Agent, or Firm* — Finnegan, Henderson, Farabow, Garrett & Dunner, LLP

(57) ABSTRACT

A system is disclosed for measuring a feature of a component. The system may have a probe with a tip, and a sensing element configured to generate signals associated with a proximity of the tip to the feature. The system may also have an actuator configured to move the probe relative to the component, and a controller in communication with the sensing element and the actuator. The controller may be configured to generate a deviation report based on the signals, and to filter information from the deviation report according to wavelength into a plurality of deviation categories corresponding to specification requirements of the component. The plurality of deviation categories may include at least a waviness category. The controller may also be configured to determine a change to a process used to fabricate the component based on the information from the deviation report filtered into the waviness category.

9 Claims, 3 Drawing Sheets

(56) References Cited

U.S. PATENT DOCUMENTS

| | | | |
|---|---|---|---|
| 5,486,924 A * | 1/1996 | Lacey | G01B 11/14 |
| | | | 356/507 |
| 5,583,443 A | 12/1996 | McMurtry et al. | |
| 6,266,371 B1 * | 7/2001 | Kondo | G06T 7/2026 |
| | | | 348/699 |
| 7,084,988 B1 * | 8/2006 | Rangarajan | H01L 22/26 |
| | | | 257/E21.528 |
| 7,239,050 B2 | 7/2007 | Miyamoto | |
| 7,464,481 B2 | 12/2008 | Ishikawa | |
| 7,715,999 B2 | 5/2010 | Kiyotani | |
| 2003/0184761 A1 * | 10/2003 | Degertekin | G01B 11/026 |
| | | | 356/511 |
| 2004/0093110 A1 * | 5/2004 | Chong | H01L 22/20 |
| | | | 700/121 |
| 2010/0064396 A1 * | 3/2010 | Nakata | G01Q 60/18 |
| | | | 850/30 |
| 2011/0266483 A1 * | 11/2011 | Xu | F16J 15/04 |
| | | | 251/315.1 |
| 2013/0185948 A1 | 7/2013 | Racine | |
| 2014/0059872 A1 | 3/2014 | Nakagawa et al. | |
| 2014/0125990 A1 * | 5/2014 | Hinderling | G02B 5/284 |
| | | | 356/496 |

OTHER PUBLICATIONS

"Gear Highlights GMX Machine Series" by Jürgen Amslinger, Mahr GmbH, Göttingen, Sep. 2014, pp. 1-24.

* cited by examiner

COMPONENT MEASUREMENT SYSTEM HAVING WAVELENGTH FILTERING

RELATED APPLICATIONS

This application is a continuation-in-part application of U.S. application Ser. No. 14/521,867, filed Oct. 23, 2014, the contents of which are expressly incorporated herein by reference.

TECHNICAL FIELD

The present disclosure relates generally to a measurement system and, more particularly, to a component measurement system having wavelength filtering.

BACKGROUND

Some manufacturers utilize measurement systems (e.g., coordinate measuring machines-CMM) during component fabrication to determine if a component is fabricated to required specifications, within allowable tolerances. If dimensions of the component are determined to match the required specifications, the component is considered acceptable and can be used for its intended purpose. Otherwise the component is rejected and discarded, or reworked until the dimensions of the component fall within the allowable tolerances. An example of such a measurement system is disclosed in U.S. Pat. No. 7,715,999 that issued to Kiyotani on May 11, 2010.

The specifications for a particular component may include requirements for dimension (e.g., length, diameter, etc.), form (e.g., flatness, parallelism, etc.), waviness (e.g., chatter), and/or roughness (e.g., fine texture). Dimensional requirements involve the full size of a component feature. Form involves a smaller number of relatively large deviations in shape across the feature. Waviness involves a greater number of smaller plus/minus deviations across the feature. Roughness entails an even greater number of peaks/valleys that make up the surface texture of the feature.

It may be possible for a manufactured component to fall within allowed tolerances for one or more of the specification requirements, but not for all of the requirements. Unfortunately, most measurement systems provide only a general deviation report listing overall dimensions of the component. It can be difficult in some situations to determine, based on the deviation report alone, whether the component is fabricated according to each requirement of the specifications. It can be even more difficult to determine what action needs to be taken to improve the associated manufacturing process so that a higher percentage of fabricated parts are acceptable.

The disclosed measurement system is directed to overcoming one or more of the problems set forth above and/or other problems of the prior art.

SUMMARY

In one aspect, the present disclosure is directed to a system for measuring a feature of a component. The system may include a probe with a tip, and a sensing element configured to generate signals associated with proximity of the tip to the feature. The system may also have an actuator configured to move the probe relative to the component, and a controller in communication with the sensing element and the actuator. The controller may be configured to generate a deviation report based on the signals, and to filter information from the deviation report according to wavelength into a plurality of deviation categories corresponding to specification requirements of the component. The plurality of deviation categories may include at least a waviness category. The controller may also be configured to determine a change to a process used to fabricate the component based on the information from the deviation report filtered into the waviness category.

In another aspect, the present disclosure is directed to another system for measuring a feature of a component. This system may include a probe having a tip, and a sensing element configured to generate signals associated with proximity of the tip to the feature. The system may also include an actuator configured to move the probe relative to the component, and a controller in communication with the sensing element and the actuator. The controller may be configured to generate a deviation report based on the signals, and to filter information from the deviation report according to wavelength into a plurality of deviation categories corresponding to component specification requirements of the component. The plurality of deviation categories may include at least a waviness category, a form error category, and a roughness category. The controller may be further configured to determine a change to a process used to fabricate the component based on categorization of the information from the deviation report. Deviations in the form error category may have greater wavelengths than deviations in the waviness and roughness categories. Deviations in the waviness category may have greater wavelengths than deviations in the roughness category.

In another aspect, the present disclosure is directed to a method of measuring a component. The method may include moving a probe into proximity of a feature of the component, generating signals indicative of the location of the probe, and generating a deviation report based on the signals. The method may also include filtering information from the deviation report according to wavelength into a plurality of deviation categories corresponding to specification requirements of the component. The plurality of deviation categories may include at least a waviness category. The method may further include determining a change to a process used to fabricate the component based on the information from the deviation report filtered into the waviness category.

DETAILED DESCRIPTION

Figure 1:
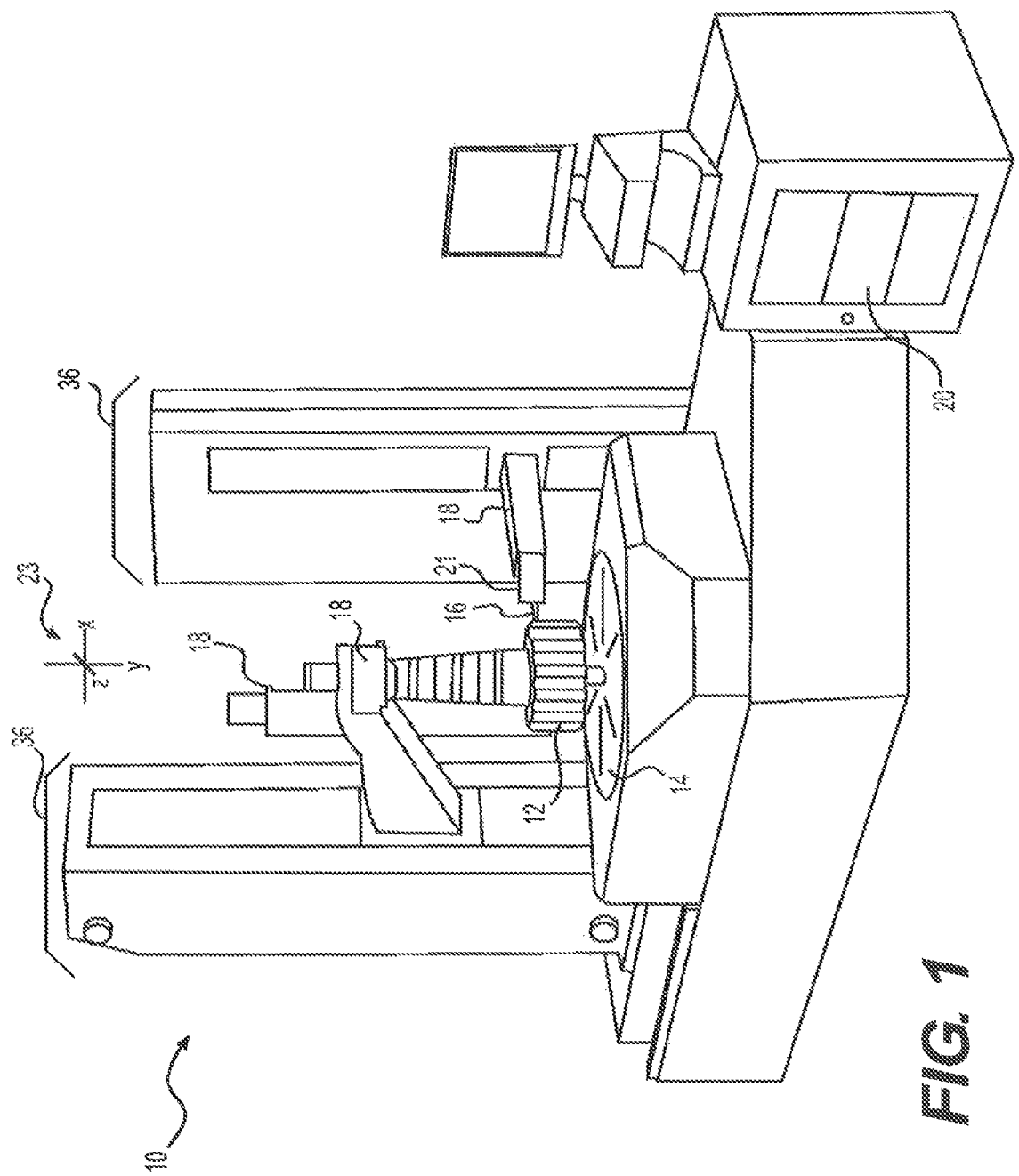
FIG. 1 is a schematic illustration of an exemplary disclosed measurement system.
Figure 2:
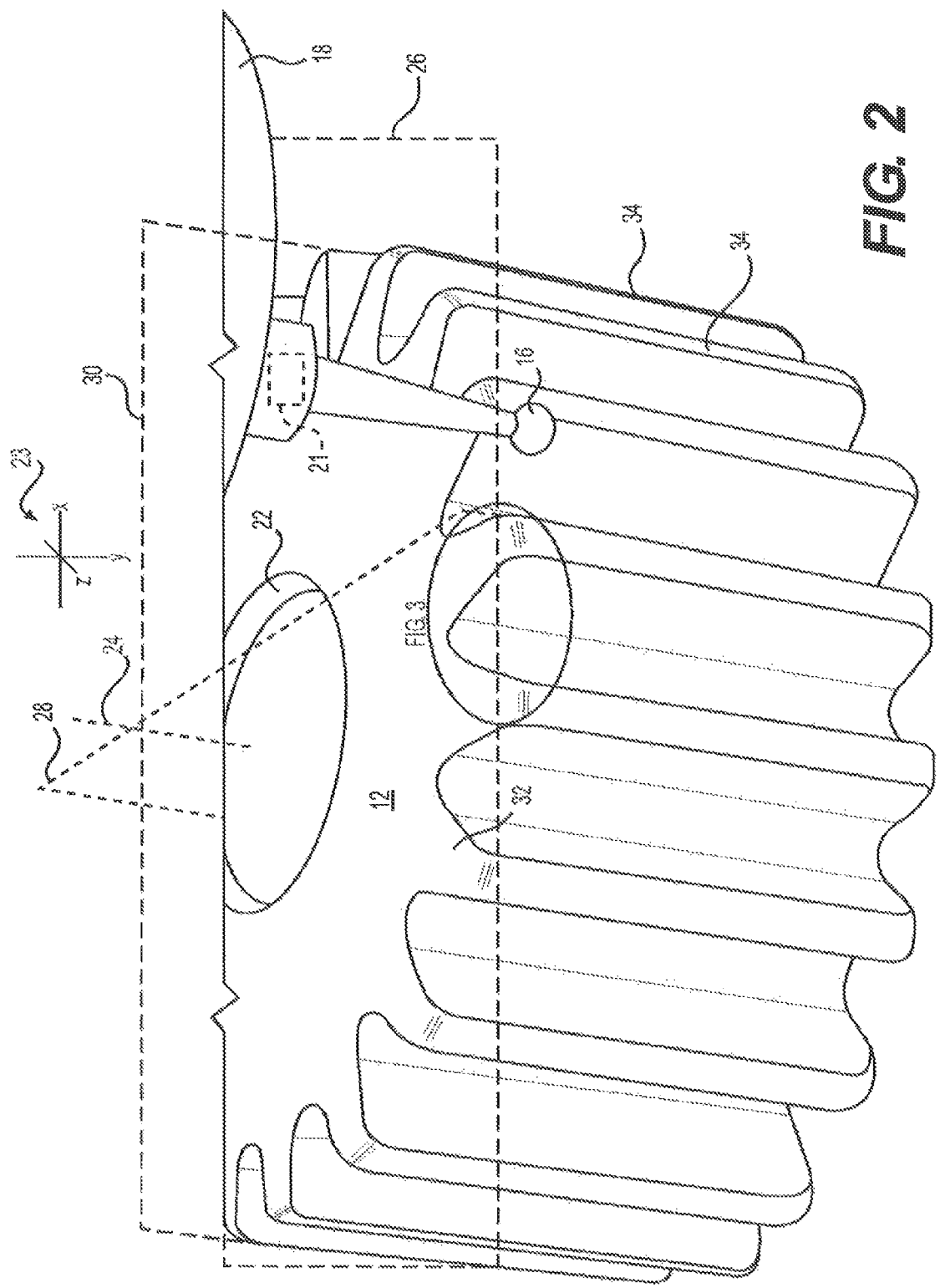
FIG. 2 is an exemplary disclosed portion of the measurement system of FIG. 1.

FIG. 1 illustrates an exemplary measurement system (system) 10. System 10 may be used to measure surfaces of different components 12 fabricated via a wide range of processes. These processes may include, for example, casting, cutting, deburring, drilling, forging, lathing, milling, welding, and other similar component-forming processes. During fabrication of component 12, the particular processes used for fabrication must produce features that conform to specified surface shapes, profiles, dimensions, and textures. For the purposes of illustration, component 12 is shown in FIGS. 1 and 2 as a gear fabricated through forging and cutting processes, and measurement system 10 may be used to measure particular features (e.g., bores, flange faces, gear teeth involutes, etc.) of component 12 after the fabrication processes are complete to help ensure the corresponding requirements are satisfied. It is understood that component 12 could be a type of component other than a gear.

Based on output from measurement system 10, component 12 may be considered acceptable for use, or rejected. In addition, the output from measurement system 10 may be used to adjust the forging, cutting, or other forming processes that produced the components. System 10 may include, among other things, a work surface 14 upon which component 12 rests during measuring, a probe 16 that performs the measurements, at least one actuator 18 operably connected to probe 16, and a controller 20 in communication with probe 16 and actuator 18. In some embodiments, controller 20 may also communicate with a display (not shown) and/or with the processing equipment (not shown) used to fabricate component 12.

Work surface 14 may include any support structure that adequately holds component 12 during measurement of component 12 by probe 16. In one embodiment, the support structure is a table or frame configured to support component 12 from an underside. In another embodiment, the structure is a rack, a spindle, or other mount that suspends component 12 at a desired location and/or in a desired orientation. It is contemplated that work surface 14 may include any number and type of devices for securing component 12 in place, for example mechanical and/or magnetic clamps (not shown). Work surface 14 may be stationary or movable, as desired.

Probe 16 may be configured to locate and engage boundaries, surfaces, and profiles of component 12 and, in some embodiments, also of work surface 14. Probe 16 may be a mechanical type of probe, an electrical type of probe, an optical type of probe, a lighted type of probe (e.g., a laser or white light probe), or another known type of probe having one or more integral sensing elements 21 that are used to generate signals corresponding to an actual location of particular surface points (a.k.a., target points) on component 12. The tip of a mechanical or electrical type of probe 16 may be brought into physical contact with the target points, while the tip of an optical or lighted type of probe 16 may only be brought near the target points. In either case, sensor element(s) 21 may detect a degree of engagement (e.g., a pressure or electrical contact) and/or proximity of the probe tip to the target points, and responsively generate contact signals directed to controller 20. The contact signals may be representative of the location, shape, dimension, profile, border, etc. of the corresponding feature. The contact signals may be correlated by controller 20 to a 3-dimensional location of the probe tip at the time of engagement, relative to known coordinate axes 23 of system 10 and/or datums defined by features of component 12 and/or work surface 14.

In the disclosed embodiment, probe 16 has a round mechanical tip with a radius of about 0.8 mm or smaller, and the probe tip is moved or scanned across features of component 12 with a data point spacing of about 0.1 mm or less. In this example, the engagement of the spherical probe tip with the features of component 12 results in signal generation used to represent actual positions of the target points of component 12 relative to coordinate axes 23.

Component 12 may include one or more features defined as datums (e.g., reference points, reference lines, or reference surfaces) for use by measurement system 10 in locating and/or measuring component 12. For example, in the embodiment of FIG. 2, component 12 includes a central bore (bore) 22, and an axis 24 of bore 22 may be used as a datum or reference line. Additionally or alternatively, one or more planes 26, 28, 30 passing through axis 24 may be also be defined as datums. In this example, planes 26, 28, and 30 may be orthogonal to each other, and plane 26 may generally correspond with (i.e., be co-planar with) an outer face 32 of component 12. Some of the target points scanned using probe 16 may lie along an involute edge profile of gear teeth 34 located at outer face 32.

Actuators 18 (referring to FIGS. 1 and 2) may include any type of device used to move the tip of probe 16 into engagement with component 12, such that 3-D position (e.g., location and orientation) information relative to coordinate axes 23 may be obtained via sensor element(s) 21. For example, actuators 18 may include electric motors, hydraulic motors, cylinders, pistons, piezos, solenoids, etc. Based on command signals from controller 20, actuators 18 may move probe 16 by a desired amount, in a desired direction, to a desired position, and/or into a desired orientation. And controller 20 may track this movement to calculate the resulting tip position of probe 16 relative to the coordinate axes 23 at the time of engagement or desired proximity with the target points of component 12. The target points may be located on any feature of component 12 (e.g., on an edge, at a surface, inside a bore, etc.), and any number of the target points may be defined as a datum or as part of a datum (e.g., part of a reference line or a reference surface) for use in determining measurement information for another target point.

In some embodiments, work surface 14, probe 16, and/or actuators 18 may be mounted on or otherwise connected to each other via a gantry 36 (shown only in FIG. 1). Gantry 36 may include, among other things, arms, bearings, belts, bridges, carriages, chains, guides, legs, rails, spindles, tracks, etc. that allow relative movement in one or more dimensions. In some embodiments, gantry 36 is connected to or forms a portion of work surface 14. In other embodiments, gantry 36 rests on or resides near work surface 14, but is not directly connected to work surface 14.

Controller 20 may be in communication with probe 16 and/or actuators 18 to control the tip placement of probe 16 and to generate the coordinate signals based on engagement or desired proximity of the tip of probe 16 with the target points of component 12. Controller 20 may embody a single or multiple microprocessors, field programmable gate arrays (FPGAs), digital signal processors (DSPs), etc. that include a means for controlling operation of system 10. If multiple microprocessors are utilized, the different microprocessors may communicate with each other and/or with a master controller, if desired, to accomplish the disclosed functions. For example, a dedicated microprocessor may be associated with movement of probe 16, while another microprocessor may be associated with generation of the coordinate signals. Still another microprocessor may be associated with processing of the signals and/or generation of corresponding reports. Numerous commercially available microprocessors can be configured to perform the functions of controller 20. Various known circuits may be associated with controller 20, including power supply circuitry, signal-conditioning circuitry, actuator driver circuitry, communication circuitry, and other appropriate circuitry.

After generation of the coordinate signals, controller 20 may process the signals to create a variety of outputs. The output may include, for example, a dimension report, a deviation report, a form error report, a waviness report, and a roughness report. The dimension report may include raw data corresponding to the coordinates of probe 16 at each target point of component 12. The deviation report may include processed data representing a difference between the measured or actual coordinates of the target points and expected target point coordinates of a design intent or perfect form component 12. For the purposes of this disclosure, the term "perfect form component" may be defined as a component having exact intended dimensions, not including tolerances. The deviation report may then be broken down into deviations of different wavelengths, and the deviations classified into ranges of deviation wavelengths that correspond with form error, waviness, and roughness. Reports may then be generated for each of these ranges. These reports may take the form of numerical spreadsheet data, data plots, line graphs, etc. The values of the wavelength boundaries (i.e., the threshold wavelengths bounding the different ranges of wavelengths) used to generate each of these reports may be customized by the operator, if desired.

Figure 3:
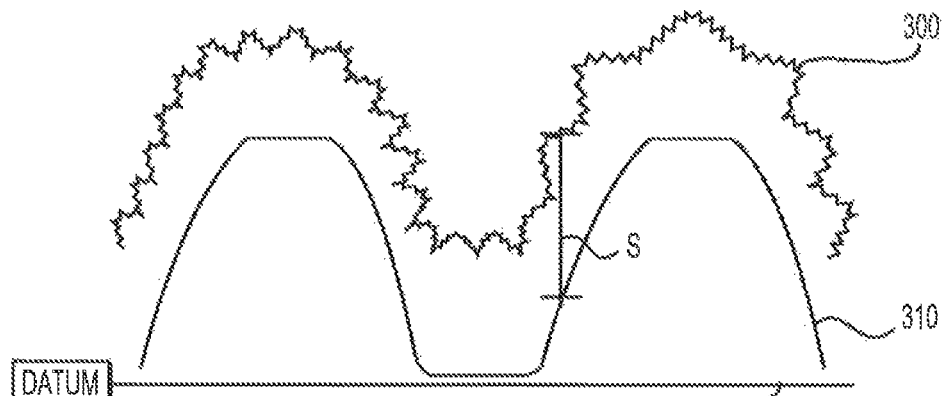
FIGS. 3-7 are exemplary reports that may be generated by the measurement system of FIG. 1.
Figure 4:
Figure 5:
Figure 6:
Figure 7:
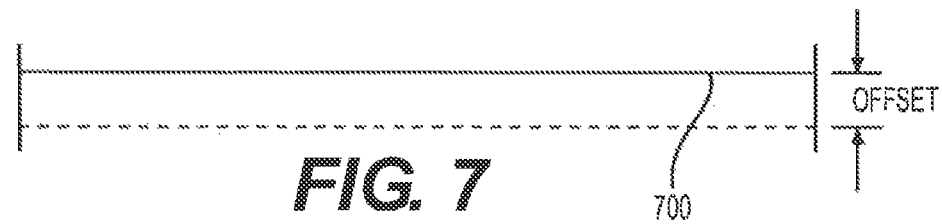

FIG. 3 shows a first curve 300 representing the raw data collected by controller 20 as probe 16 moves about and engages the target points of particular component features. The raw data may correspond with the coordinate locations of the target points relative to one or more of datums 24-30. As discussed above, the dimension report may be a collection of this raw data. In addition, FIG. 3 also shows a second curve 310 representing the design intent or perfect form of component 12. A difference between an actual location of a target point and an intended location of the target point (e.g., the spacing S between curves 300 and 310) may correspond with a deviation between an actual surface of component 12 at the target point and a virtual surface of the design intent or perfect form of the component feature. The deviation report discussed above may be a collection of data representing these deviations, the data being calculated by controller 20 as a subtraction function from the two sets of coordinates.

While the deviation report itself may be of some use, knowing the makeup of the deviations in the report may be more helpful in determining if the produced component 12 is acceptable for its intended use and/or for determining the cause and solution of individual types of deviations. Accordingly, controller 20 may be configured to break down curve 300 into multiple different curves, each curve representing a different type of deviation. Some deviations may be categorized as having a wavelength within a particular range, while other deviations may be represented by a generally constant offset. For the purposes of this disclosure, a deviation wavelength may be defined as a distance in any one direction (e.g., in the X-direction, the Y-direction, or the Z-direction) between successive high or low extremes of target point coordinate deviation values, as measured by probe 16.

The process of breaking down curve 300 into the different deviation types is illustrated in FIGS. 4-7. For example a first range of deviations having a wavelength of $\lambda_0$-$\lambda_1$ (shown by a curve 400 in FIG. 4) may correspond with a surface roughness of a measurement surface of component 12. A second range of deviations having a wavelength of $\lambda_1$-$\lambda_2$ (shown by a curve 500 in FIG. 5) may correspond with a waviness of component 12. In one embodiment, $\lambda_1$ may be about 0.8 mm, and $\lambda_2$ may be about 4-8 mm. In this embodiment, deviations included in the waviness report may primarily be caused by machining feed marks. In other embodiments, however, machining feed marks may only be a subset of the deviations included in the waviness report. A third range of deviations having a wavelength of $\lambda_2$-$\lambda_3$ (shown by a curve 600 in FIG. 6) may correspond with a form error. An offset deviation (shown by a curve 700 in FIG. 7) may correspond with a dimensional error. Curves 400-700 compound (e.g., add together) to make curve 300. As will be explained in more detail in the following section, controller 20 may be configured to sequentially apply a series of wavelength filters to the data contained in the deviation report, and to generate separate reports associated with each different range of wavelengths. Controller 20 may then determine corresponding changes to the process(es) used to fabricate the component feature based on the separate reports.

INDUSTRIAL APPLICABILITY

The disclosed measurement system may be utilized to determine deviations of a fabricated component from a design intent or perfect form component. In particular, the disclosed measurement system may be configured to measure the fabricated component relative to component datums, and to generate corresponding reports associated with two or more of dimensional error, form error, waviness, and roughness. This level of deviation detail may then be used to accept the component for its intended use or to reject the component. In addition, the level of detail provided by the disclosed measurement system may facilitate diagnosis of rejected components, and adjustment to the associated fabrication processes that reduces the frequency of the components being rejected. Operation of measurement system 10 will now be described.

The disclosed measurement system may be activated after a component 12 has been loaded onto work surface 14. Component 12 may be automatically or manually placed onto work surface 14, and clamped in place using any methodology known in the art. Information corresponding to the intended or perfect form of component 12 may then be loaded into controller 20, along with definitions (e.g., type, orientation, and/or location) relative to at least one component datum. The component datum may be defined as part of work surface 14 or as a point, line, and/or surface of component 12. This information may be loaded into controller 20 by an operator of system 10.

Thereafter, probe 16 may be energized to detect the pre-defined component datums and to begin measuring the locations of specified target points on component 12 with respect to one or more of the datums. For example, controller 20 may selectively energize one or more of actuators 18 to move probe 16 into proximity of a particular target point (or combination of points defining a datum). Once the tip of probe 16 has engaged the target point(s) (or come within a desired distance of the target point(s)), a signal (e.g., a pressure signal, an electrical signal, an optical signal, etc.) may be generated indicating the degree of engagement. Controller 20 may then correlate (for example based on known kinematics of system 10) the coordinates of the tip of probe 16 and the corresponding coordinates of the target point(s) offset from the tip end at the time of engagement. Signals generated by probe 16 may then be used to create the dimension report described above, and a comparison of the signals relative to intended or perfect form coordinates of the same target points may be used to create the deviation report. For example, the intended form coordinates for each of the target points may be subtracted from the measured coordinates.

Controller 20 may then use the comparison information from the deviation report to determine dimensional error, form error, waviness (e.g., machining feed marks), and surface roughness of component 12. In particular, controller 20 may filter the information according to a plurality of predefined wavelength ranges. For example, any relative surface measurement differential (i.e., any measured deviation from the perfect form) having a wavelength in the range of $\lambda_0$-$\lambda_1$ relative to a predefined datum or reference feature may be considered to correspond with surface roughness; any relative surface measurement differential having a wavelength in the range of $\lambda_1$-$\lambda_2$ (e.g., 0.8-8 mm) may be considered to correspond with waviness (e.g., with machining feed marks); and any relative surface measurement differential having a wavelength in the range of $\lambda_2$-$\lambda_3$ may be considered to correspond with errors of form. Dimensional information, such as a particular feature of component 12 being longer than a target length, may have no wavelength aspect, but is reported as simply a constant offset of a feature surface from an intended position. Controller 20 may sequentially filter the deviations into the four different deviation categories (or into fewer or more categories, as desired) based on maps, equations, and/or algorithms stored in memory. Controller 20 may then create reports for each of the different categories.

Because the disclosed system may provide increased detail regarding component surface measurements, it may be easier to determine based on the detail if the component was manufactured according to associated specifications. In particular, it may be possible to determine if the component has a desired size, form, waviness, and surface roughness.

It may also be possible to determine, based on the detailed deviation reports, what actions should or can be taken if one or more of the specification requirements are not achieved. For example, a form or dimensional error may be caused by incorrect placement of component 12 relative to processing tools, while waviness and/or roughness may have to do with a worn tool, improper clamping, improper component hardness, improper tool pressure, or an aged processing machine. Accordingly, by addressing one or more of these factors, in combination with review of the deviation reports, the quality of component 12 may be improved.

For example, when using a probe 16 having a 0.8 mm (or smaller) tip to measure a particular feature (edge, surface, bore, etc.), with 0.1 mm point spacing, the deviation report may show a deviation value within the waviness wavelength range that exceeds specification requirements for the particular feature. In order to reduce the waviness deviation value for the same feature on future-produced components 12 to below the specification requirement, a machining feed rate may be reduced, a larger processing tool (e.g., a tool having a larger nose radius) may be used, a stiffness of the processing tool may be increased, a processing temperature may be changed, and/or a secondary operation (e.g., a reaming or wiping operation) may be implemented. Additionally or alternatively, component 12 may be clamped to work surface 14 at a greater number of locations, with greater pressure, and/or with enhanced vibration absorbing backing. Further, a hardness of component 12 may be increased, such that processing results in shallower removal passes. Other similar processing changes may also be made based on the waviness report to help ensure that a greater number of components 12 pass inspection.

It may also be possible to reduce a processing cost of component 12 when the deviation reports indicate deviation values far below the specification requirements. For example, when the deviation report shows a deviation value within the waviness wavelength range that is far below specification requirements for the particular feature, it may be possible to make adjustments to the fabrication process that reduce fabrication cost without causing the deviation values of future components 12 to exceed their specification requirements. That is, the deviation values may increase some due to these adjustments, but the deviation values may still be below the specification requirements. And such adjustments could reduce a fabrication cost of component 12.

For example, in order to increase the waviness deviation value for the same feature on future-produced components 12. (yet still maintain the value below the specification requirement), a machining feed rate may be increased, a smaller and cheaper processing tool (e.g., a tool having a smaller nose radius) may be used, a processing temperature may be lowered, and/or a secondary operation (e.g., a reaming operation) may be omitted. Additionally or alternatively, component 12 may be clamped to work surface 14 at a reduced number of locations, with less pressure, and/or without backing. Further, a hardness of component 12 may be decreased, such that processing results in deeper removal passes. Other similar processing changes may also be made.

The process changes implemented based on categorization of the information in the deviation report may be automatically determined and/or implemented by controller 20. In particular, in some embodiments, controller 20 may be configured to only determine the process changes based on known process parameters, known component geometry, and the deviation reports. The process changes may then be recommended to a human operator, who can manually implement the changes. Alternatively, controller 20 may also be configured to automatically communicate the process changes to the corresponding process equipment (e.g., to other controllers that regulation motion of the process equipment). In yet another embodiment, controller 20 may be a master controller capable of controlling both measurement system 10 and the processing equipment. In this embodiment, controller 20 may automatically implement the adjustments to improve quality and/or to reduce fabrication costs of component 12. It is contemplated that the generation of the deviation reports and the process adjustments may be periodically completed or continuously completed, as desired.

It will be apparent to those skilled in the art that various modifications and variations can be made to the disclosed system and method without departing from the scope of the disclosure. Other embodiments of the disclosed system and method will be apparent to those skilled in the art from consideration of the specification and practice of the system and method disclosed herein. It is intended that the specification and examples be considered as exemplary only, with a true scope of the disclosure being indicated by the following claims and their equivalents.

What is claimed is:

1. A system for measuring a component, comprising:
   a probe;
   at least one actuator operably connected to the probe and configured to move the probe relative to the component; and
   a controller in communication with the probe and the at least one actuator to control the movement of the probe relative to the component based on command signals from the controller;
   the probe configured to move across and engage target points along surfaces of the component and generate signals corresponding to actual locations of the target points of the component detected by engagement of the probe with the target points;
   the controller being configured to:
      receive coordinates of intended form target points;
      receive one or more definitions of one or more component datums from an operator of the system;

receive actual locations of the one or more component datums detected via the probe;
determine coordinates of the actual locations of the target points of the component relative to one or more component datums based on the signals;
make a comparison of the coordinates of the intended form target points and the coordinates of the actual locations of the target points by subtracting the coordinates of the intended form target points from the coordinates of the actual locations of the target points;
generate a deviation report based on the comparison;
filter information from the deviation report according to wavelength into a plurality of wavelength deviation categories each including a range of deviation wavelengths defined by wavelength boundaries wherein the wavelength deviation categories include one or more of a form error category, a waviness category, and a roughness category, and wherein values of wavelength boundaries bounding the range of deviation wavelengths of at least one of the deviation categories are customizable by an operator of the system; and
filter information from the deviation report into an offset deviation category, the offset deviation category defined by a dimensional offset deviation of a feature surface from an intended position.

2. The system of claim 1, wherein the controller is configured to filter the information from the deviation report into three different deviation categories.

3. The system of claim 2, wherein deviations in a form error category have greater wavelengths than deviations in waviness and roughness categories.

4. The system of claim 3, wherein deviations in the waviness category have greater wavelengths than deviations in the roughness category.

5. A system for measuring a component, comprising:
a probe;
at least one actuator operably connected to the probe and configured to move the probe relative to the component; and
a controller in communication with the probe and the at least one actuator to control the movement of the probe relative to the component based on command signals from the controller;
the probe configured to move across and engage target points along surfaces of the component and generate signals corresponding to actual locations of the target points of the component detected by engagement of the probe with the target points;
the controller being configured to:
  receive coordinates of intended form target points;
  receive one or more definitions of one or more component datums from an operator of the system;
  receive information regarding one or more actual locations of the one or more component datum detected via the probe;
  determine coordinates of the actual locations of the target points of the component relative to at least one component datum based on the signals;
  determine a difference between the coordinates of the intended form target points and the coordinates of the actual locations of the target points;
  generate a deviation report based on the difference;
  filter information from the deviation report according to ranges of different deviation wavelengths into a form error category, a waviness category, and a roughness category wherein each of the form error category, the waviness category, and the roughness category include a range of deviation wavelengths defined by wavelength boundaries;
  wherein:
    deviations in a form error category have greater wavelengths than deviations in waviness and roughness categories;
    deviations in the waviness category have greater wavelengths than deviations in the roughness category; and
    values of wavelength boundaries bounding the range of deviation wavelengths of the form error category and the waviness category are customizable by an operator of the system; and
  filter information from the deviation report into an offset deviation category, the offset deviation category defined by a dimensional offset deviation of a feature surface from an intended position.

6. A method of measuring a component, comprising:
moving a probe across a surface of the component to engage target points along the surface of the component;
receiving from an operator information regarding definition of at least one component datum;
detecting actual locations of the at least one component datum;
measuring actual locations of the target points relative to the at least one component datum;
receiving perfect form locations of the target points;
making a comparison of the actual locations and the perfect form locations, wherein making the comparison includes subtracting coordinates of the perfect form locations of the target points from the actual locations of the target points;
generating a deviation report based on the comparison;
receiving from an operator a desired value for a threshold wavelength of at least one of a plurality of deviation categories;
filtering information from the deviation report according to wavelength into the plurality of deviation categories, wherein the plurality of deviation categories include a form error category and a waviness category; and
filtering information from the deviation report into an offset deviation category, the offset deviation category defined by a dimensional offset deviation of a feature surface from an intended position.

7. The method of claim 6, wherein the different deviation categories further include a roughness category.

8. The method of claim 7, wherein deviations in the form error category have greater wavelengths than deviations in the waviness and roughness categories.

9. The method of claim 8, wherein deviations in the waviness category have greater wavelengths than deviations in the roughness category.

* * * * *